United States Patent
Zihlmann et al.

(10) Patent No.: US 10,633,283 B2
(45) Date of Patent: Apr. 28, 2020

(54) METHOD AND DEVICE FOR TREATING AND UTILIZING BYPASS DUSTS

(71) Applicant: Holcim Technology Ltd., Jona (CH)

(72) Inventors: Serge Lukas Zihlmann, Basel (CH); Florian Christian Gross, Berlin (DE)

(73) Assignee: Holcim Technology, Ltd., Jona (CH)

( * ) Notice: Subject to any disclaimer, the term of this patent is extended or adjusted under 35 U.S.C. 154(b) by 122 days.

(21) Appl. No.: 15/577,225

(22) PCT Filed: May 20, 2016

(86) PCT No.: PCT/IB2016/000672
§ 371 (c)(1),
(2) Date: Nov. 27, 2017

(87) PCT Pub. No.: WO2016/189374
PCT Pub. Date: Dec. 1, 2016

(65) Prior Publication Data
US 2018/0148374 A1    May 31, 2018

(30) Foreign Application Priority Data

May 28, 2015    (AT) .................................. A 339/2015

(51) Int. Cl.
*C04B 7/43* (2006.01)
*C02F 1/463* (2006.01)
(Continued)

(52) U.S. Cl.
CPC .............. *C04B 7/436* (2013.01); *B01D 47/02* (2013.01); *C02F 9/00* (2013.01); *C04B 7/60* (2013.01);
(Continued)

(58) Field of Classification Search
CPC ............ C04B 7/60; C04B 7/436; C02F 1/463
See application file for complete search history.

(56) References Cited

U.S. PATENT DOCUMENTS

2003/0061972 A1*  4/2003  Key, Jr. ................... C01F 11/46
                                                                  106/772
2009/0283016 A1* 11/2009  Mohamed ............... C04B 2/005
                                                                  106/638
(Continued)

FOREIGN PATENT DOCUMENTS

GB        2484699 A      4/2012
WO   2012/142638 A1    10/2012

OTHER PUBLICATIONS

J. Forinton & P. Motes de Oca, "ReduDust: A system for bypass dust recovery" A TEC Group. Sep 2012 (Year: 2012).*
(Continued)

*Primary Examiner* — Steven A. Friday
(74) *Attorney, Agent, or Firm* — Fitch, Even, Tabin & Flannery, LLP

(57) ABSTRACT

A method for treating and utilizing bypass dusts from a cement production process involves a) contacting the bypass dust with an aqueous phase and mixing the same to obtain a suspension, wherein water-soluble components of the bypass dust are dissolved in the aqueous phase; b) performing a solid/liquid separation, in particular a vacuum filtration or a filter press filtration, to separate the solids contained in the suspension, wherein a brine remains; c) precipitating a partial amount of the heavy metals present in the brine, and optionally Ca, and separating the precipitate from the brine; and d) subjecting the brine to an electrocoagulation, wherein a flocculate containing the heavy metals remaining in the brine is separated.

22 Claims, 1 Drawing Sheet

(51) Int. Cl.
  *C04B 7/60* (2006.01)
  *B01D 47/02* (2006.01)
  *C02F 9/00* (2006.01)
  C02F 1/00 (2006.01)
  C02F 1/52 (2006.01)
  C02F 1/66 (2006.01)
  C02F 103/34 (2006.01)

(52) U.S. Cl.
  CPC .............. *C02F 1/004* (2013.01); *C02F 1/463* (2013.01); *C02F 1/5236* (2013.01); *C02F 1/66* (2013.01); *C02F 2001/007* (2013.01); *C02F 2001/5218* (2013.01); *C02F 2103/34* (2013.01); *Y02P 40/121* (2015.11)

(56) References Cited

U.S. PATENT DOCUMENTS

| | | | |
|---|---|---|---|
| 2010/0065502 A1* | 3/2010 | Konishi | C02F 1/4672 210/665 |
| 2012/0145647 A1 | 6/2012 | Volkel et al. | |
| 2014/0109801 A1 | 4/2014 | Sipple et al. | |

OTHER PUBLICATIONS

International Search Report for PCT/IB2016/000672 dated Aug. 11, 2016 submitted herewith (5 pages).
Written Opinion of the International Searching Authority, issued in International Application PCT/IB2016/000672.

\* cited by examiner

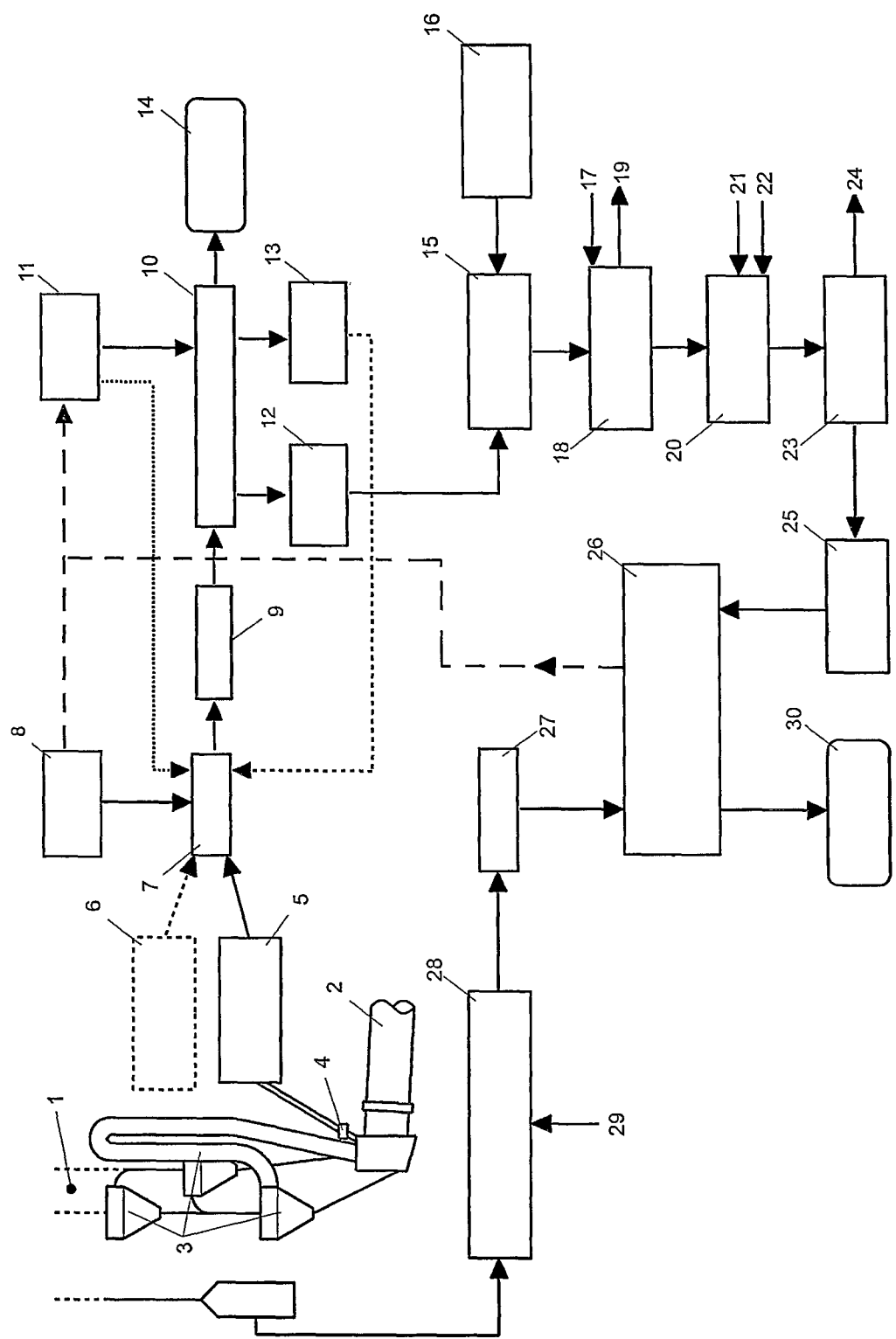

METHOD AND DEVICE FOR TREATING AND UTILIZING BYPASS DUSTS

CROSS-REFERENCE TO RELATED APPLICATIONS

This application is the U.S. national phase application filed under 35 U.S.C. § 371 of International Application No. PCT/IB2016/000672, filed May 20, 2016, designating the United States, and claims priority from Austrian Patent Application No. A 339/2015, filed May 28, 2015, and the complete disclosures of which applications are hereby incorporated herein by reference in their entirety for all purposes.

The invention relates to a method for treating and utilizing bypass dusts from the cement production process, comprising the steps of contacting the bypass dust with an aqueous phase and mixing the two in order to obtain a homogenous suspension, wherein water-soluble components of the bypass dust are dissolved in the aqueous phase (step a), and performing a solid/liquid separation, in particular a vacuum filtration or a filter press filtration, in order to separate the solids contained in the suspension, wherein a brine remains (step b).

The invention further relates to a device for carrying out such a method.

A method and a device of the initially defined kind are known from WO 2012/142638 A1.

The main components of bypass dusts are CaO, $SiO_2$, $Al_2O_3$, $Fe_2O_3$ and MgO as well as condensed impurities such as $K_2O$, $Na_2O$, $SO_3$ and Cl. In cement production, the hot exhaust gases from the kiln are used to preheat the raw meal. The vaporous components such as $K_2O$, $Na_2O$, $SO_3$ and Cl, which are contained in the exhaust gas, condense due to cooling and are returned into the kiln along with the raw meal. An internal circulation of such substances evaporating in the kiln and condensing out of the exhaust gas during preheating of the raw meal is thus created in cement production. Along with the raw meal or the fuels, new unavoidable components are constantly introduced such that the described circulations will become increasingly enriched unless a portion of the hot exhaust gases from the kiln is constantly withdrawn, and hence also the evaporated impurities are proportionally eliminated from the production process. This partial gas stream is cooled and dedusted, the dust being referred to as cement kiln gas bypass dust or briefly bypass dust in the following, wherein the unavoidable components condense on the dust grains and are separated from the exhaust gas along with the dust. The occurring bypass dust can be used as a cement grinding additive as a function of its composition and the desired cement quality.

The use of alternative fuels or the use of specific raw materials in the cement production process, and the associated introduction of additional unavoidable components, involve the formation of increasing amounts of bypass dusts, which cannot be completely utilized without elaborate processing and are, therefore, partially dumped by many cement producers, thus constituting a considerable environmental impact. Dumping is also disadvantageous in that it entails accordingly high losses of components suitable for cement production. As a rule, an economically reasonable use of such products in the cement industry has failed because of alkali, chloride, sulfur or heavy metal contents that are too high.

In the subject matter of WO 2012/142638 A1, the bypass dust is mixed with an aqueous phase, wherein water-soluble components of the bypass dust are dissolved in the aqueous phase and the solids contained in the suspension are separated by a solid/liquid separation with brine remaining. After this, the brine is treated in several steps to separate the heavy metals present in the brine and to precipitate calcium. The thus treated brine is finally subjected to fractional crystallization in order to primarily obtain KCl and NaCl. The method according to WO 2012/142638 A1, however, involves the drawback that the treatment of the brine comprises a number of steps using chemicals hazardous to health and complex in handling, such as $Na_2S$ as precipitant for separating heavy metals by sulfide precipitation, alkali carbonates ($Na_2CO_3$, $K_2CO_3$) as precipitants agent for precipitating $CaCO_3$, $H_2O_2$ in order to remove sulfide anions ($S^{2-}$), and HCl for lowering the pH in order to destroy excess $H_2O_2$.

There is thus the object to improve a method of the initially defined kind with a view to enabling the simplified treatment of brine, the lowering of costs and, at the same time, the achievement of a high degree of heavy metal separation.

To solve this object, the invention in a method of the initially defined kind essentially consists in that a partial amount of the heavy metals present in the brine, and optionally Ca, are precipitated and the precipitate is separated from the brine (step c), and that the brine is subjected to an electrocoagulation, wherein a flocculate containing the heavy metals remaining in the brine is separated (step d).

The separation of heavy metals thus takes place in two steps, a first part of the heavy metals being precipitated in step c) and the remaining part of the heavy metals being separated in step d). This, in particular, enables the overall reduction of the content of heavy metals, in particular Cr, Pb, Cd and Sb, to below 0.005 mg/L. In the first step, heavy metals and, in particular, the major portion of the contained lead can be separated, especially in the form of their hydroxides or carbonates. In the second step, the separation of, in particular, chromium(III,VI) is possible.

In a preferred manner, precipitating according to step c) comprises the adding of a precipitant, in particular $CO_2$ or carbonates, in particular alkali carbonates such as $Na_2CO_3$ or $K_2CO_3$. In this respect, the use of $CO_2$ is particularly preferred, in particular where $CO_2$-containing exhaust gas from the clinker production kiln is used. The addition of $CO_2$ results in a reduction of the pH of the brine so as to promote the precipitation of the heavy metals. $CO_2$ is preferably added in such quantities that the pH of the brine is reduced to 8.5-10.5 from an initial value of 12-13. The addition of $CO_2$, moreover, induces the removal of the hydrated lime dissolved in the brine by carbonate precipitation. The simplest way is to blow $CO_2$-rich gas directly into the brine. The reaction equations are as follows:

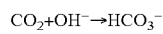

$$CO_2 + OH^- \rightarrow HCO_3^-$$

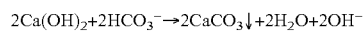

$$2Ca(OH)_2 + 2HCO_3^- \rightarrow 2CaCO_3 \downarrow + 2H_2O + 2OH^-$$

The reduction of the pH may, however, also be achieved by adding an acid such as HCl, $H_2SO_4$ or the like, said reduction of the pH causing the precipitation of the heavy metals.

If also the precipitation of Ca is sought in this case, carbonates, above all alkali carbonates such as $Na_2CO_3$ or $K_2CO_3$ may, in particular, be added as precipitants. The addition of $Na_2CO_3$ or $K_2CO_3$ will, in particular, be of advantage if the purified brine is to be subjected to a final crystallization so as to enable the recovery of NaCl and KCl.

The second step of the heavy metal separation is realized by electrocoagulation. Electrocoagulation is a simple and efficient technique, by which a flocculant is formed in situ by an electrically induced oxidation of an anode. The plate-shaped anode is preferably designed as a Fe and/or Al electrode. The anodes are alternately placed opposite to cathodes so as to form a plate stack. All of the cathodes and anodes are connected in an electrically conductive manner. The plate-shaped counter-cathode can be made of any conductive material, and preferably it is made of the same material as the anode so as to enable pole changing for purifying the plates and extending the lifetime of the plates until exchange due to the uniform wear of the electrode pairs. The distance of the plates is selected as a function of the specific conductance of the brine.

At the direct voltage applied, which ranges from 2-10 V, preferably between 2-5 V, and at current densities of 400-800 A/m$^2$, the following reactions occur at the anode/cathode and in the solution, resulting in a reduction of the heavy metal load:

Anode

The enforced potential of the anode causes oxidations reactions, and in particular will the anode be dissolved while forming $Fe^{2+}$, $Fe^{3+}$ and/or $Al^{3+}$ ions. At the same time, gaseous oxygen is released at a sufficient potential. The following semi-reactions listed in the direction of reduction take place:

$$Fe^{2+}+2e^-=Fe^0-0.44\ V$$

$$Fe^{3+}+e^-=Fe^{2+}+0.77\ V\ or$$

$$Al^{3+}+3e^-=Al^0-1.662\ V\ and$$

$$O_{2(g)}+4H^++4e^-=H_2O+1.23\ V$$

Cathode $$2H_2O+2e^-=2OH^-+H_{2(g)}-0.83\ V$$

Furthermore, a direct reduction of heavy metals occurs, e.g. the reduction of hexavalent chromium Cr(VI) und dichromate:

$$Cr^{6+}+3e^-=Cr^{3+}+1.33\ V$$

$$Cr_2O_7^{2-}+6e^-+14H^+=2Cr^{3+}+7H_2O+1.33\ V$$

In Solution

In solution, secondary reactions with the formed ions take place between the plates and/or in a consecutively arranged flocculation tank. Reduction of Cr(VI) by the redox reaction:

$$Cr^{6+}+3Fe^{2+}\rightarrow Cr^{3+}+3Fe^{3+}$$

Heavy metals, e.g. Cr and Pb, are directly precipitated by hydroxides:

$$Cr^{3+}+3OH^-\rightarrow Cr(OH)_3\downarrow$$

$$Pb^{2+}+2OH^-\rightarrow Pb(OH)_2\downarrow$$

and/or attach to Fe/Al hydroxide flakes:

$$Fe^{2+}+2OH^-\rightarrow Fe(OH)_2\downarrow$$

$$Al^{3+}+3OH^-\rightarrow Al(OH)_3\downarrow$$

The oxygen formed on the anode further results in oxidations:

$$2Fe(OH)_2+H_2O+\tfrac{1}{2}O_{2(g)}\rightarrow 2Fe(OH)_3$$

After all, the removal of heavy metals is based on various mechanisms and, in particular, on the in-situ generation of highly active coagulants ($Fe^{2+}$, $Fe^{3+}$, $Al^{3+}$), furthermore on reduction/oxidation reactions occurring on the electrodes, and on field and polarization effects. As a sum reaction, metal is oxidized on the anode and hydrogen is released on the cathode by the reduction. The simultaneous production of $OH^-$ ions on the cathode causes a rise in the pH.

Due to the high salt content of the brine to be treated, electrocoagulation is particularly energy-saving. The salt content increases the electric conductivity of the brine such that the power consumption, and hence the operating costs, can be lowered.

In regard to the separation of the substances precipitated in steps c) and d) and obtained by electrocoagulation, the following approaches are preferred. The separation of the precipitate in step c) is advantageously performed by gravity sedimentation. The separation of the flocculate in step d) is preferably effected by filtration, in particular in a filter press, or by centrifugation.

The solid-liquid separation according to step b) is preferably performed by a continuous separation method, wherein the suspension and an aqueous phase are conducted in counter-current, and contacted, in a continuously operating separation device, in particular a belt filter or vacuum belt filter. In doing so, a weak brine can be withdrawn after having passed a first section of the continuous separation device, and a strong brine can be withdrawn after having passed a further section of the continuous separation device.

In a preferred manner, it may further be provided that the weak brine remaining after the second and/or any further separation step, or water, and/or the weak brine withdrawn from the continuous separation device are used for suspending the bypass dust or the forming filter cake in step a), and/or for washing the filter cake resulting in the first or second separation step.

A preferred reuse of the utilizable components of the bypass dust will be accomplished in that the solids separated in step c) and/or step d), after optionally required drying, are returned into the cement production process, in particular as cement grinding additive or as raw meal component.

It may finally be provided that the treated brine obtained from step d) is subjected to a fractional crystallization. In this case, waste heat from the cement production process, in particular from the preheater or the clinker cooler, is preferably used in the fractional crystallization for evaporating the treated brine. The waste heat from the cement production process, in particular from the preheater or the clinker cooler, may optionally also be used for drying the salt obtained in the fractional crystallization.

In this respect, it will be particularly beneficial if the waste heat from the cement production process, in particular from the preheater or the cement cooler, is fed to vapor production, and the vapor is used for heating and evaporating the treated brine in the fractional crystallization, wherein the evaporated water of the brine is at least partially recovered for further evaporating the brine. Heat carrier oil may be additionally employed as a heat transfer means.

The reuse of process water is preferably feasible in that the brine water evaporated in the fractional crystallization is at least partially used for suspending the bypass dusts and/or for suspending or washing out the solids separated in the various separation steps.

To sum up, the method according to the invention has the following advantages. Operating costs are lowered, because the use of expensive chemicals can be renounced. The treatment of the brine requires a small number of treatment steps such that the method can be automated in a simple manner. Due to the renouncement of the use of chemicals, the operating safety and the protection of the personnel from work-related hazards to their safety and health can be increased. The $CO_2$ emissions from the clinker production process can be reduced, because $CO_2$ from the kiln can be reutilized as precipitant.

According to a further aspect of the invention, a device for carrying out the method of the invention is provided, comprising a mixing device for contacting the bypass dust with an aqueous phase, a first separation device for performing a solid-liquid separation, in particular a vacuum filtration or a filter press filtration, and a treatment device for treating the brine discharged from the separation device, said treatment device comprising an electrocoagulation device.

A preferred further development provides that the electrocoagulation device is followed by a second separation device, in particular a centrifuge or a filtration device, for separating the flocculate obtained in the electrocoagulation device.

In an advantageous manner, the treatment device further comprises a bath upstream the electrocoagulation device and including a mixing device for precipitating calcium and a partial amount of the heavy metals present in the brine.

In the following, the invention will be explained in more detail by way of an exemplary embodiment schematically illustrated in the drawing.

In FIG. 1, a cement production process is schematically indicated by 1, comprising a rotary tubular kiln 2 and a precalcining or preheating system 3 connected to the charging end of the rotary tubular kiln 2. At the point schematically indicated by 4, bypass dusts are taken from the cement production process and stored in a silo 5. In a further silo 6, dusts optionally taken from another point of the cement production process are stored. According to step a) of the method according to the invention, the dusts from silos 5 and/or 6 are supplied to a mixing device 7, in which the dusts are contacted with an aqueous phase and/or a weak alkaline brine stored in a tank 8 and 11 or 13, respectively, and are thoroughly mixed to obtain a homogenous suspension. If desired, hydrochloric acid can be added to the dissolution process occurring in the mixing device 7, in order to adjust the contents of alkalis and halides. By 9 is schematically denoted an extraction step in which the soluble components of the suspension are washed out of the solid components and dissolved in the aqueous phase. The suspension is subsequently supplied to a vacuum belt filter 10, in which step b) of the method according to the invention is carried out. In the vacuum belt filter 10, the suspension and process water from 11 are conducted in countercurrent. After a first section of the vacuum belt filter 10, viewed in the transport direction of the suspension, a strong brine 12 is drawn off. After a second section of the vacuum belt filter 10, viewed in the transport direction of the suspension, a weak brine 13 is drawn off and a filter cake 14 remains. Basically, the washing step can be repeated as often as desired. The filter cake 14 is subsequently dried and can be returned to the cement production process 1 as a raw meal component or as a cement grinding additive. The weak alkaline brine 13 can be supplied to the mixing device 7.

According to step c) of the method according to the invention, the strong alkaline brine 12 is subjected to a precipitation 15 of calcium and heavy metals, wherein a $CO_2$-containing gas 16 is blown in and mixing is effected by a mixing device. This causes the pH of the brine to drop to 8.5-10.5. In order to perform gravity sedimentation, optionally upon addition of a flocculant 17, the brine is transferred into a sedimentation tank 18, in which $CaCO_3$ and heavy metal hydroxides 19 are separated. The thus partially purified brine is charged into an electrocoagulation device 20, in which the remaining heavy metals, in particular chromium, are coagulated by supplying electric energy 21 using Fe and/or Al anodes 22. The separation of the coagulated particles takes place in a separation device 23, in particular a filtration device or a centrifuge, wherein the separated components 24 are supplied to the cement as Fe and/or Al correctives.

From this results a treated and purified brine 25, which is optionally subjected to a fractional crystallization 26. Water vapor 27 produced with the aid of waste heat 28 from the preheater exhaust gas or from the clinker cooler waste air is used to heat and evaporate the brine. Fresh water 29, freed of dissolved salts, in particular calcium salts, by reverse osmosis is used to produce the water vapor 27. Furthermore, the evaporation water from the fractional crystallization 26 can also be reused as process water 11, as indicated by the dashed line.

The fractional crystallization 26 produces several salts 30, these being primarily KCl, NaCl and mixtures thereof. KCl can be used with particular advantage in the fertilizer industry. NaCl and KCl/NaCl mixtures can, for instance, be employed as deicing agents, in particular for traffic surfaces, or even in the aluminum industry. The salts derived from the crystallization 26 are optionally subjected to salt drying (not illustrated) so as to obtain dried alkali salts 30.

The invention will be further described by way of exemplary embodiments described below.

Example 1

At first, brine was prepared on a vacuum belt filter according to steps (a) and (b), the thus obtained crude brine having a pH of 12.32 and a conductivity of 126 mS/cm. By blowing in $CO_2$, the crude brine was neutralized to a pH of 8.45, thus causing the sedimentation of a white precipitate, which was removed after 12 hours of sedimentation so as to obtain a neutralized brine. The neutralized brine was subjected to an electrocoagulation at an electric voltage of 6.0 V using Fe plates. The flocculate was filtered in a filter press so as to obtain a pure brine. By the described method, the contents of Pb and Cr could be lowered as follows.

| Concentration mg/L | Pb | Cr |
|---|---|---|
| Crude brine | ND | ND |
| Neutralized brine | <0.005 | 0.129 |
| Pure brine | <0.005 | <0.005 |

Example 2

At first, brine was prepared on a vacuum belt filter according to steps (a) and (b), the thus obtained crude brine having a pH of 12.07 and a conductivity of 136 mS/cm. By blowing in $CO_2$, the crude brine was neutralized to a pH of 8.13, thus causing the sedimentation of a white precipitate, which was removed after 5 hours of sedimentation so as to obtain a neutralized brine. The neutralized brine was subjected to an electrocoagulation at an electric voltage of 4.0 V using Fe and Al plates. The flocculate was filtered in a filter press so as to obtain a pure brine. By the described method, the contents of heavy metals could be lowered as follows.

| Concentrate mg/L | Pb | Cr | Sb | Cd | Zn | Cu |
|---|---|---|---|---|---|---|
| Crude brine | 32.2 | 1.11 | ND | ND | ND | ND |
| Neutral. brine | 1.01 | 1.08 | 2.58 | 0.0154 | 0.0374 | 0.0368 |
| Pure brine | <0.005 | <0.005 | <0.005 | <0.0005 | 0.0111 | 0.0154 |

Example 3

At first, brine was prepared on a vacuum belt filter according to steps (a) and (b), the thus obtained crude brine having a pH of 11.01 and a conductivity of 102 mS/cm. By blowing in $CO_2$, the crude brine was neutralized to a pH of 8.29, thus causing the sedimentation of a white precipitate, which was removed after 3 hours of sedimentation so as to obtain a neutralized brine. The neutralized brine was subjected to an electrocoagulation at an electric voltage of 3.8 V using Fe and Al plates. The flocculate was filtered in a filter press so as to obtain a pure brine. By the described method, the contents of Pb and Cr could be lowered as follows.

| Concentration mg/L | Pb | Cr |
|---|---|---|
| Crude brine | ND | ND |
| Neutralized brine | 1.107 | ND |
| Pure brine | 0.101 | <0.005 |

Example 4

At first, brine was prepared on a vacuum belt filter according to steps (a) and (b), the thus obtained crude brine having a pH of 12.24 and a conductivity of 198 mS/cm. By blowing in $CO_2$, the crude brine was neutralized to a pH of 8.54, thus causing the sedimentation of a white precipitate, which was removed after 3 hours of sedimentation so as to obtain a neutralized brine. The neutralized brine was subjected to an electrocoagulation at an electric voltage of 4.0 V using Fe and Al plates. The flocculate was filtered in a filter press so as to obtain a pure brine. By the described method, the contents of Pb and Cr could be lowered as follows.

| Concentration mg/L | Pb | Cr |
|---|---|---|
| Crude brine | ND | ND |
| Neutralized brine | 3.07 | 0.02 |
| Pure brine | 0.719 | <0.005 |

The invention claimed is:

1. A method for treating and utilizing bypass dusts from a cement production process, comprising the steps of
    a) contacting the bypass dust with an aqueous phase and mixing the same to obtain a homogenous suspension, wherein water-soluble components of the bypass dust are dissolved in the aqueous phase,
    b) performing a solid/liquid separation in order to separate the solids contained in the suspension, wherein a brine remains,
    c) precipitating a partial amount of the heavy metals present in the brine, and optionally Ca, and separating the precipitate from the brine,
    d) subjecting the brine to an electrocoagulation, wherein a flocculate containing the heavy metals remaining in the brine is separated.

2. The method according to claim 1, wherein step c), the precipitating comprises adding a precipitant.

3. The method according to claim 2, wherein the precipitant comprises $CO_2$ or a carbonate(s), wherein the carbonate (s) comprises an alkali carbonate.

4. The method according to claim 3, wherein the alkali carbonate comprises $Na_2CO_3$ or $K_2CO_3$.

5. The method according to claim 2, wherein the precipitant comprises $CO_2$-containing exhaust gas from a kiln.

6. The method according to claim 1, wherein step c), the precipitating comprises reducing the pH of the brine.

7. The method according to claim 6, wherein the pH of the brine is reduced by adding an inorganic acid comprising HCl or $H_2SO_4$.

8. The method according to claim 1, wherein the method further comprises subjecting a treated brine obtained according to step d) to fractional crystallization.

9. The method according to claim 1, wherein in step c), the separating comprises gravity sedimentation.

10. The method according to claim 1, wherein separating the flocculate in step d) further comprises filtering or centrifuging out the flocculate.

11. The method according to claim 10, wherein the filtering comprises using a filter press.

12. The method according to claim 1, wherein the solid-liquid separation according to step b) is performed by a continuous separation method, wherein the suspension and an aqueous phase are conducted in counter-current, and contacted, in a continuously operating separation device comprising a belt filter or vacuum belt filter.

13. The method according to claim 1, wherein said method further comprises, after optionally drying the solids separated in step c) and/or step d), returning the solids recovered as a cement grinding additive(s) or as raw meal component to a cement production process.

14. The method according to claim 1, wherein the electrocoagulation in step d) is conducted using a Fe and/or Al anode.

15. The method according to claim 1, wherein in step c) a calcium salt is precipitated, and wherein the precipitated calcium salt from step c) is added to the suspension in step a) and separated as a solid in step b).

16. The method according to claim 1, wherein the solid/liquid separation comprises a vacuum filtration or a filter press filtration.

17. An apparatus adapted and configured for carrying out the method according to claim 1, wherein said device comprises
    a mixing device for contacting the bypass dust with an aqueous phase,
    a first separation device for performing a solid-liquid separation on a mixture obtained from the mixing device, wherein the first separation device is arranged upwards the electrocoagulation device, and
    a treatment device downstream of the first separation device for treating the brine discharged from the first separation device, said treatment device comprising an electrocoagulation device that is separate from the mixing device.

18. The apparatus according to claim 17, wherein the apparatus further comprises a second separation device for separating the flocculate obtained in the electrocoagulation device, said second separation device comprising a centrifuge or a filtration device.

19. The apparatus according to claim 17, wherein the treatment device further comprises a bath before the electrocoagulation device and including a mixing device for precipitating calcium and a partial amount of the heavy metals present in the brine.

20. The apparatus according to claim 17, wherein the electrocoagulation device comprises a Fe and/or Al anode.

21. The apparatus according to claim 17, wherein the apparatus further comprises a device for carrying out a fractional crystallization treatment following the treatment device.

22. The apparatus according to claim 17, wherein the first separation device for performing a solid-liquid separation is a separation device for performing a vacuum filtration or a filter press filtration.

* * * * *